(12) United States Patent
Lee (10) Patent No.: US 12,101,002 B2
(45) Date of Patent: Sep. 24, 2024

(54) MOTOR

(71) Applicant: LG INNOTEK CO., LTD., Seoul (KR)

(72) Inventor: Jin Seob Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 304 days.

(21) Appl. No.: 17/785,160

(22) PCT Filed: Dec. 1, 2020

(86) PCT No.: PCT/KR2020/017365
§ 371 (c)(1),
(2) Date: Jun. 14, 2022

(87) PCT Pub. No.: WO2021/125620
PCT Pub. Date: Jun. 25, 2021

(65) Prior Publication Data
US 2023/0015228 A1 Jan. 19, 2023

(30) Foreign Application Priority Data
Dec. 18, 2019 (KR) .......................... 10-2019-0169843

(51) Int. Cl.
*H02K 11/215* (2016.01)
*H02K 1/27* (2022.01)
(52) U.S. Cl.
CPC ............. *H02K 11/215* (2016.01); *H02K 1/27* (2013.01)
(58) Field of Classification Search
CPC ......... H02K 11/215; H02K 1/27; H02K 11/21
USPC ................................................... 310/156.06
See application file for complete search history.

(56) References Cited

U.S. PATENT DOCUMENTS

| 5,408,153 A * | 4/1995 | Imai ....................... H02K 29/08 318/560 |
| 2019/0101413 A1* | 4/2019 | Murata .................. H02K 29/08 |
| 2020/0028428 A1* | 1/2020 | Uehara ................ H02K 49/102 |

FOREIGN PATENT DOCUMENTS

| JP | 05-011777 | 2/1993 |
| JP | 06-178502 | 6/1994 |
| JP | 2009192263 A * | 8/2009 |
| JP | 2019-066415 | 4/2019 |

(Continued)

OTHER PUBLICATIONS

International Search Report dated Mar. 18, 2021 issued in Application No. PCT/KR2020/017365.

*Primary Examiner* — Jeremy A Luks
(74) *Attorney, Agent, or Firm* — KED & ASSOCIATES, LLP (57) ABSTRACT

An embodiment may provide a motor including a shaft, a rotor coupled to the shaft, and a stator disposed between the shaft and the rotor, wherein the rotor includes a yoke coupled to the shaft and a driving magnet and a sensing magnet which are coupled to the yoke, the sensing magnet includes a first sensing magnet and a second sensing magnet, a first pole and a second pole are alternately disposed on a first circumference of the first sensing magnet, and the second sensing magnet is disposed on a second circumference having a radius different from a radius of the first circumference and includes a first pole and a second pole of which a length in a circumferential direction is different from a length of the first pole of the second sensing magnet in the circumferential direction.

10 Claims, 13 Drawing Sheets

(56) References Cited

FOREIGN PATENT DOCUMENTS

| | | |
|---|---|---|
| KR | 10-0816372 | 3/2008 |
| WO | WO 2014/141370 | 9/2014 |

* cited by examiner

MOTOR

CROSS-REFERENCE TO RELATED PATENT APPLICATIONS

This application is a U.S. National Stage Application under 35 U.S.C. § 371 of PCT Application No. PCT/KR2020/017365, filed Dec. 1, 2020, which claims priority to Korean Patent Application No. 10-2019-0169843, filed Dec. 18, 2019, whose entire disclosures are hereby incorporated by reference.

TECHNICAL FIELD

The present invention relates to a motor.

BACKGROUND ART

A motor may include a rotor, a stator, and a shaft. The shaft is coupled to the rotor. The rotor may be disposed outside the stator. Due to an electromagnetic interaction between the rotor and the stator, the rotor rotates, and when the rotor rotates, the shaft rotates.

Such a motor may be used as a driving source configured to rotate a sensor device (for example, a light detection and ranging (LiDAR) device). A shaft of the motor is connected to the sensor device. In this case, constant speed driving of the motor may be an important factor to secure the performance of the sensor device. The constant speed driving of the motor may be determined by detecting a position of the rotating rotor. In order to detect the position of the rotor, the motor may include a Hall sensor configured to detect a change in magnetic flux of a drive magnet disposed on the rotor. However, when a high constant speed condition is required for the motor used in the sensor device, there is a problem of a limit in satisfying the constant speed condition of the motor only by detecting the change in the magnetic flux due to the general drive magnet.

Accordingly, a separate sensing magnet magnetized with a multipole may be used in order to increase a resolution. For example, a first sensing magnet and a second sensing magnet may be disposed on two circumferences which are concentric with each other. Since it is difficult to magnetize the one first sensing magnet to have many poles, the second sensing magnet can be additionally disposed to more precisely detect a position of a rotor. An example thereof is to use a sensing signal generated by the second sensing magnet as an index signal for recognizing one turn of the motor.

However, magnetizing the first sensing magnet and the second sensing magnet disposed on the two circumferences to have the many poles at the same time is a very difficult and cumbersome problem.

Technical Problem

The present invention is directed to providing a motor capable of precisely recognizing a position of a rotor using a sensing magnet with a simple structure.

Objectives to be solved by the present invention are not limited to the above-described objectives, and other objectives which are not described above will be clearly understood by those skilled in the art from the following specification.

Technical Solution

One aspect of the present invention provides a motor including a shaft, a rotor coupled to the shaft, and a stator disposed between the shaft and the rotor, wherein the rotor includes a yoke coupled to the shaft and a driving magnet and a sensing magnet which are coupled to the yoke, the sensing magnet includes a first sensing magnet and a second sensing magnet, a first pole and a second pole are alternately disposed on a first circumference of the first sensing magnet, and the second sensing magnet is disposed on a second circumference having a radius different from a radius of the first circumference and includes a first pole and a second pole of which a length in a circumferential direction is different from a length of the first pole of the second sensing magnet in the circumferential direction.

Another aspect of the present invention provides a motor including a base and a sensing magnet disposed on the base, wherein the sensing magnet includes a first sensing magnet disposed on a first circumference and a second sensing magnet disposed on a second circumference, a first pole and a second pole are alternately disposed in the first sensing magnet, and the second sensing magnet includes a first pole, of which a length in a circumferential direction is longer than a length of the first pole of the first sensing magnet in the circumferential direction, and a second pole of which a length is longer than the length of the first pole of the second sensing magnet in the circumferential direction.

The length of the first pole of the second sensing magnet in the circumferential direction may be longer than a length of the first pole of the first sensing magnet in the circumferential direction.

The length of the first pole of the second sensing magnet in the circumferential direction may be shorter than the length of the second pole of the second sensing magnet in the circumferential direction.

One end of the second sensing magnet and one end of the first sensing magnet may be disposed on a first straight line in a radial direction, and the other end of the second sensing magnet and the other end of the first sensing magnet may be disposed on different straight lines in the radial direction.

The first straight line may correspond to a reference position of a rotation angle of the rotor.

The second sensing magnet may have one first pole and one second pole.

The first straight line may correspond to the reference position of the rotation angle of the rotor.

The yoke may include a base, a magnet accommodation part protruding from the base, and a column part protruding from the magnet accommodation part.

The sensing magnet may be disposed on the base.

The length of the first pole of the second sensing magnet in the circumferential direction may be shorter than a sum of the length of one first pole in the circumferential direction and the length of one second pole in the circumferential direction in the first sensing magnet.

The first sensing magnet and the second sensing magnet may be concentrically disposed.

The first sensing magnet and the second sensing magnet may overlap in the radial direction.

The motor may include a substrate spaced apart from the yoke, and the substrate may include a first sensor of which at least a part overlaps the first sensing magnet in an axial direction and a second sensor of which a part overlaps the second sensing magnet in the axial direction.

The sensing magnet may include a non-magnetized region, and the non-magnetized region may be disposed between the first sensing magnet and the second sensing magnet in the radial direction.

The motor may include a substrate spaced apart from the yoke, and the substrate may include a third sensor of which a part overlaps the first sensing magnet in the axial direction and a part overlaps the second sensing magnet in the axial direction.

Advantageous Effects

According to embodiments, an advantageous effect of satisfying a high constant speed driving condition is provided.

According to the embodiments, there is an advantage of simplifying a structure of a second sensing magnet.

According to the embodiments, there is an advantage of precisely recognizing a position of a rotor by generating an index signal using the second sensing magnet.

According to the embodiments, there is an advantage of precisely recognizing the position of the rotor using one sensor.

MODES OF THE INVENTION

A direction parallel to a longitudinal direction (vertical direction) of a shaft is an axial direction, a direction perpendicular to the axial direction about the shaft is a radial direction, and a direction along a circumference of a circle having a radius in the radial direction about the shaft is a circumferential direction.

Figure 1:
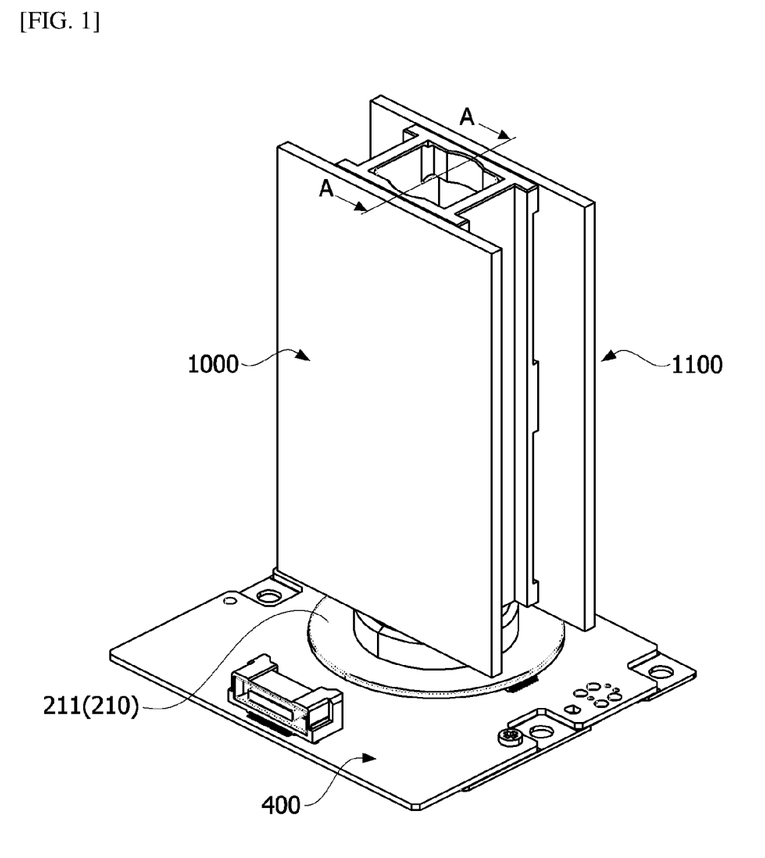
FIG. 1 is a perspective view illustrating a motor according to an embodiment.
Figure 2:
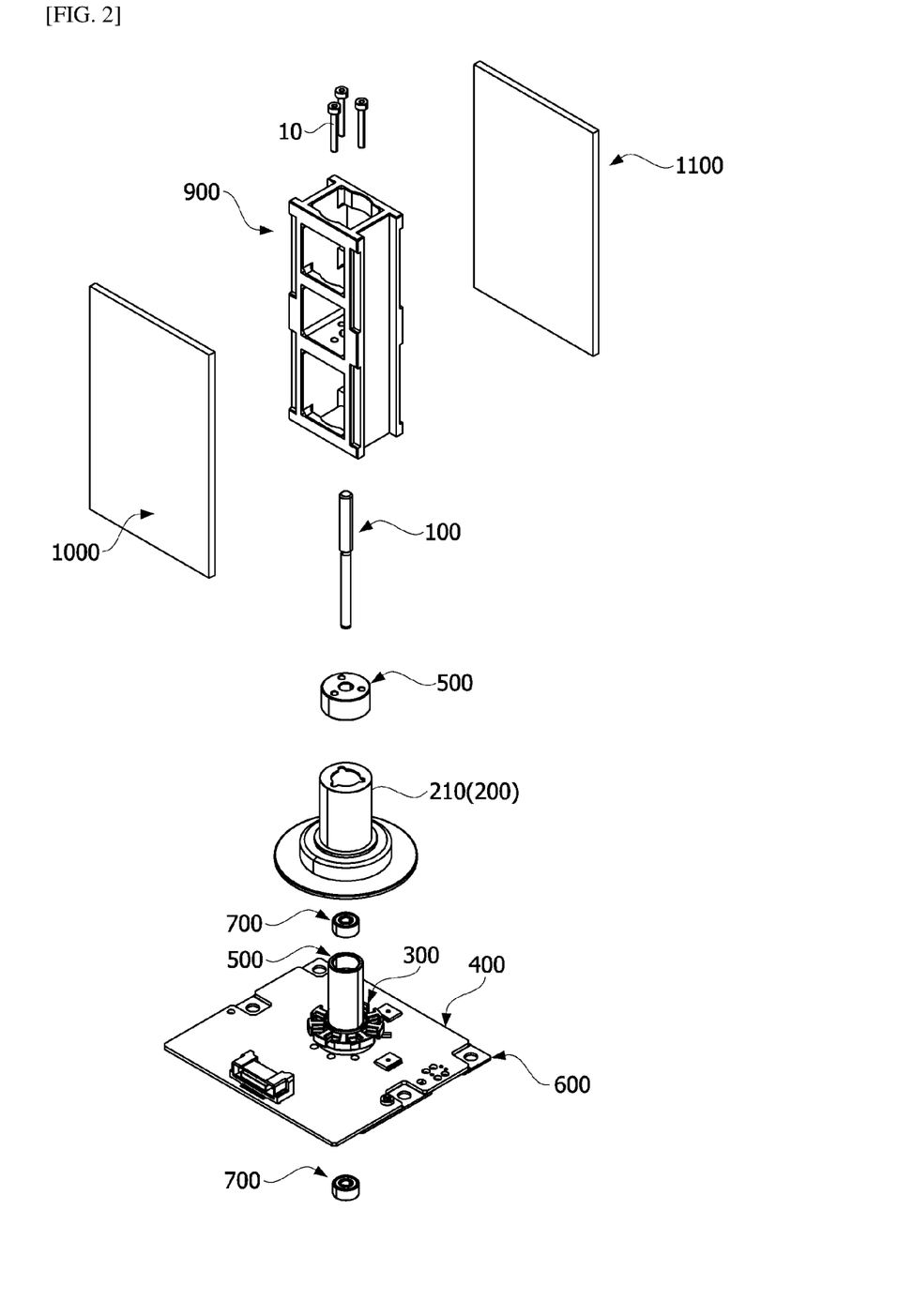
FIG. 2 is an exploded perspective view illustrating the motor illustrated in FIG. 1.
Figure 3:
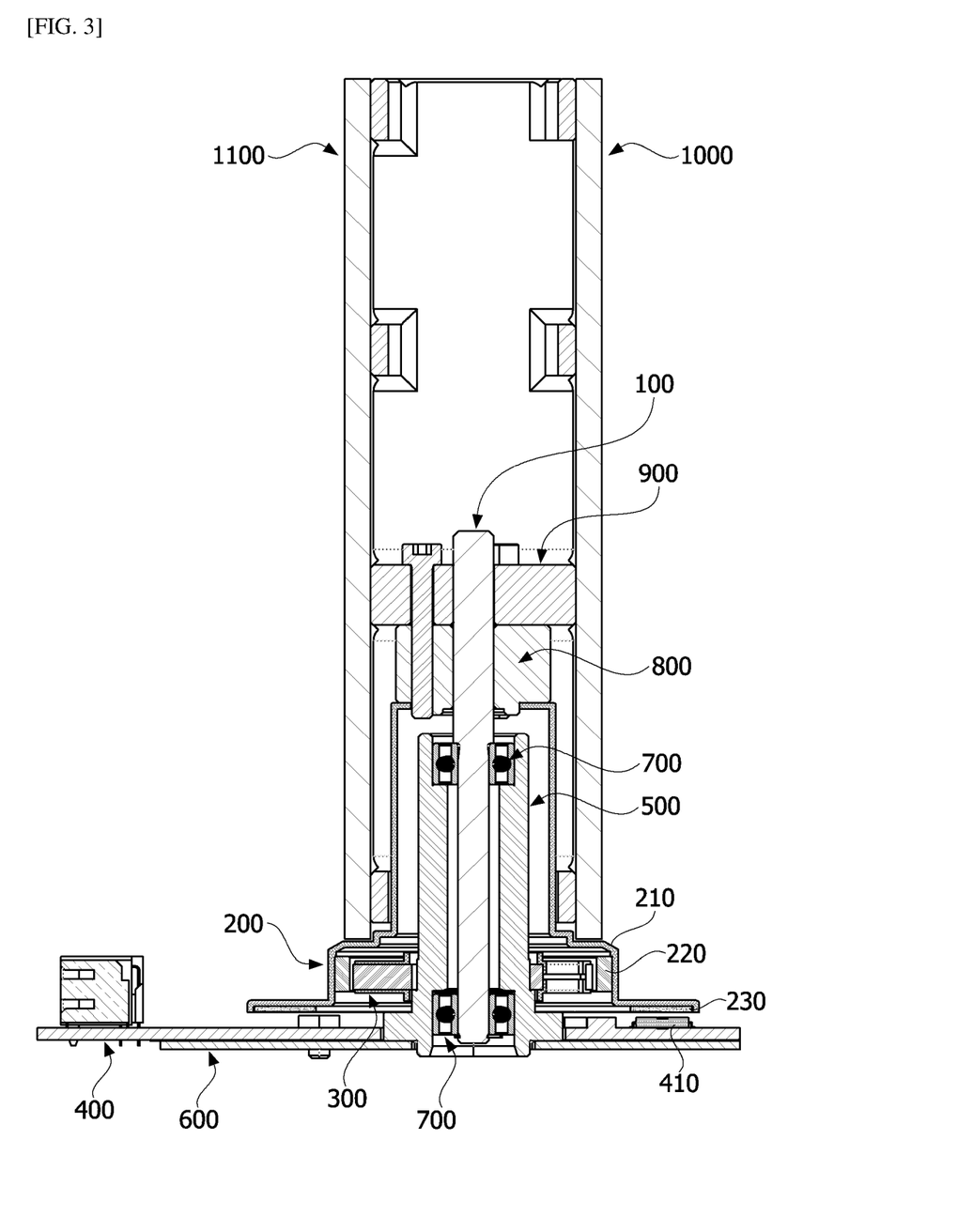
FIG. 3 is a side cross-sectional view illustrating the motor along line A-A of FIG. 1.

FIG. 1 is a perspective view illustrating a motor according to an embodiment, FIG. 2 is an exploded perspective view illustrating the motor illustrated in FIG. 1, and FIG. 3 is a side cross-sectional view illustrating the motor along line A-A of FIG. 1. Hereinafter, the term "inward" refers to a direction toward the shaft 100, and the term "outward" refers to a direction opposite to "inward."

Referring to FIGS. 1 to 3, the motor according to the embodiment may include a shaft 100, a rotor 200, and a stator 300.

The shaft 100 is coupled to a yoke 210 of the rotor 200. The shaft 100 may be coupled to the yoke 210 in a press-fit manner. Alternatively, the shaft 100 and the yoke 210 may be integrally formed. The shaft 100 rotates along with the rotor 200. The shaft 100 is rotatably supported by bearings disposed inside a bearing housing 500.

The rotor 200 may include the yoke 210, a driving magnet, and a sensing magnet.

The yoke 210 is coupled to the shaft 100. The shaft 100 may be positioned at a center of the yoke 210.

A driving magnet 220 is for rotation of the yoke 210. The driving magnet 220 may be disposed on an inner surface of the yoke 210. The driving magnet 220 may be disposed to face the stator 300 in a radial direction of the rotor 200. When an electrical interaction occurs between the driving magnet 220 and a coil of the stator 300, the yoke 210 rotates. The driving magnet 220 may be formed by combining a plurality of unit magnets. Alternatively, the driving magnet 220 may be a single part having a ring shape.

The sensing magnet 230 is for precisely recognizing a position of the rotor 200. The sensing magnet 230 may be disposed on the inner surface of the yoke 210. In addition, the sensing magnet 230 may be disposed to face a substrate 400 in an axial direction.

The stator 300 may be disposed between the shaft 100 and the yoke 210. The stator 300 may be fixed to an outer surface of the bearing housing 500. The stator 300 may include a core of the stator 300 including a plurality of teeth, and a coil may be wound around the teeth. The teeth may include an insulator insulating the coil from the core of the stator 300.

The substrate 400 is disposed at one side of the yoke 210. The substrate 400 may include a first sensor 410 and a second sensor 420. The first sensor 410 may be a Hall integrated circuit (IC) configured to detect a change in magnetic flux of the sensing magnet 230. The second sensor 420 may be an encoder IC. Both the first sensor 410 and the second sensor 420 may be disposed to face the sensing magnet 230 in the axial direction.

The bearing housing 500 is a member for accommodating bearings 700 thereinside. The bearing housing 500 may include a region like a cylindrical member disposed to extend in the axial direction.

The bearing housing 500 is fixed to the plate 600. Although it is illustrated that the plate 600 and the bearing housing 500 are individual parts, the plate 600 and the bearing housing 500 may also be integrally molded. The substrate 400 may be seated on one surface of the plate 600.

The bearings 700 may be installed inside one end portion and the other end portion of the bearing housing 500 in the axial direction. The bearings 700 rotatably support the shaft 100. The bearings 700 may be disposed not to overlap the stator 300 in the radial direction of the motor. For example, any one of two bearings 700 may be disposed above the stator 300, and the other of the two bearings 700 may be disposed under the stator 300 in the axial direction. In addition, any one of the two bearing 700 may be disposed above the driving magnet 220 in the axial direction.

A bushing 800 is a member for coupling the yoke 210 and a holder 900. The bushing 800 is disposed between the yoke 210 and the holder 900 in the axial direction and couples the yoke 210 and the holder 900. In the bushing 800, a hole in which a screw tap is formed in the axial direction may be formed. A coupling member 10 which passes through and is coupled to a partial region of the holder 900 is coupled to the hole disposed in the bushing 800 to couple the yoke 210 and the holder 900. When the yoke 210 rotates, the bushing 800 rotates, and the holder 900 also rotates therewith. The bushing 800 may be a cylindrical member. One surface of the bushing 800 may be in contact with the yoke 210, and the other surface of the bushing 800 may be in contact with the holder 900 in the axial direction.

The holder 900 fixes mirrors 1000 and 1100. In addition, the holder 900 is coupled to the bushing 800 and rotates with the yoke 210. The holder 900 may be a member having a frame of which a cross section has an H-beam shape. The holder 900 having the above-described shape has advantages that it is strong against bending and a weight is significantly reduced. The first mirror 1000 and the second mirror 1100 may be disposed on one surface and the other surface of the holder 900 to face each other.

The mirrors 1000 and 1100 serve to reflect a laser emitted to a detection target. The mirrors 1000 and 1100 may include a first mirror 1000 disposed on one surface of the holder 900 and a second mirror 1100 disposed on the other surface of the holder 900. When the yoke 210 rotates, the holder 900 rotates, and the mirrors 1000 and 1100 also rotate according to the rotation of the holder 900. The mirrors 1000 and 1100 may be plate-shaped members extending in the axial direction. The mirrors 1000 and 1100 and the holder 900 may be coupled by an adhesive.

Figure 4:
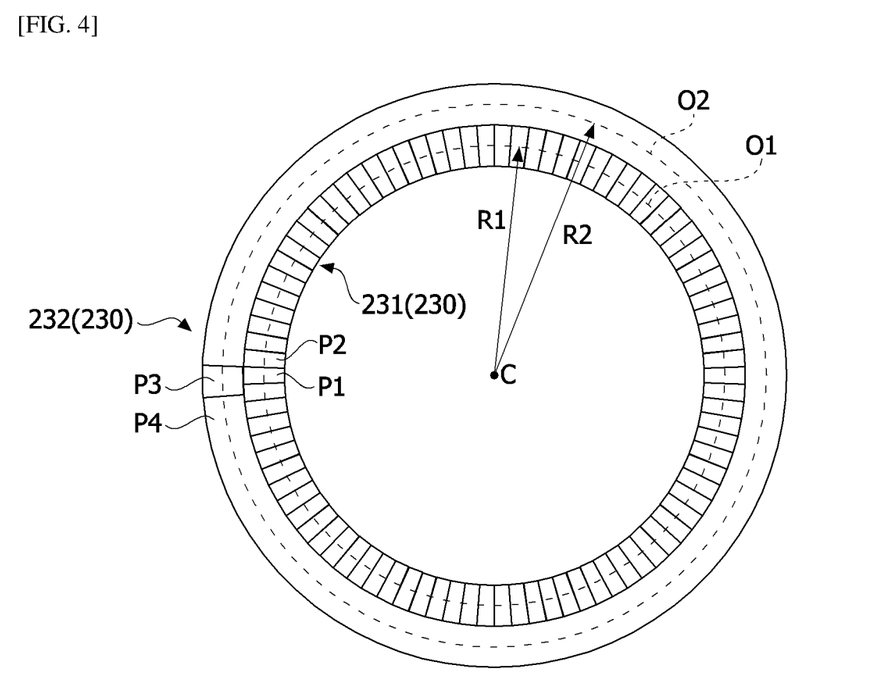
FIG. 4 is a plan view illustrating a sensing magnet.

FIG. 4 is a plan view illustrating the sensing magnet.

Referring to FIG. 4, the sensing magnet 230 may include a first sensing magnet 231 and a second sensing magnet 232.

The first sensing magnet 231 is disposed on a first circumference O1. For example, the first sensing magnet 231 may be disposed so that a center of the first sensing magnet 231 in the radial direction is disposed on the first circumference O1. The second sensing magnet 232 is disposed on a second circumference O2. For example, the second sensing magnet 232 may be disposed so that a center of the second sensing magnet 232 in the radial direction is disposed on the second circumference O2. The first circumference O1 and the second circumference O2 are disposed to be concentric with each other about a center C of the sensing magnet 230. That is, the first sensing magnet 231 and the second sensing magnet 232 may be disposed concentrically. In addition, the first sensing magnet 231 and the second sensing magnet 232 may be disposed to overlap in the radial direction. A radius of the first circumference O1 is smaller than a radius of the second circumference O2. Accordingly, the second sensing magnet 232 may be disposed outside the first sensing magnet 231.

The first sensing magnet 231 is a member configured to generate a sensing signal for precisely detecting a position of the rotor 200. The first sensing magnet 231 may include a plurality of first poles P1 and a plurality of second poles P2. The first poles P1 and the second poles P2 may be alternately disposed in a circumferential direction of the sensing magnet 230. Polarities of the first poles P1 are different from those of the second poles P2. For example, hereinafter, the first poles P1 may be N-poles, and the second poles P2 may be S-poles.

The second sensing magnet 232 is a member configured to generate a sensing signal for detecting one turn of the rotor 200. The second sensing magnet 232 may include a first pole P3 and a second pole P4. For example, the second sensing magnet 232 may include one first pole P3 and one second pole P4. The second pole P4 is disposed at two sides of the first pole P3 in order to more precisely detect a change in magnetic flux at a boundary of the first pole P3.

Figure 5:
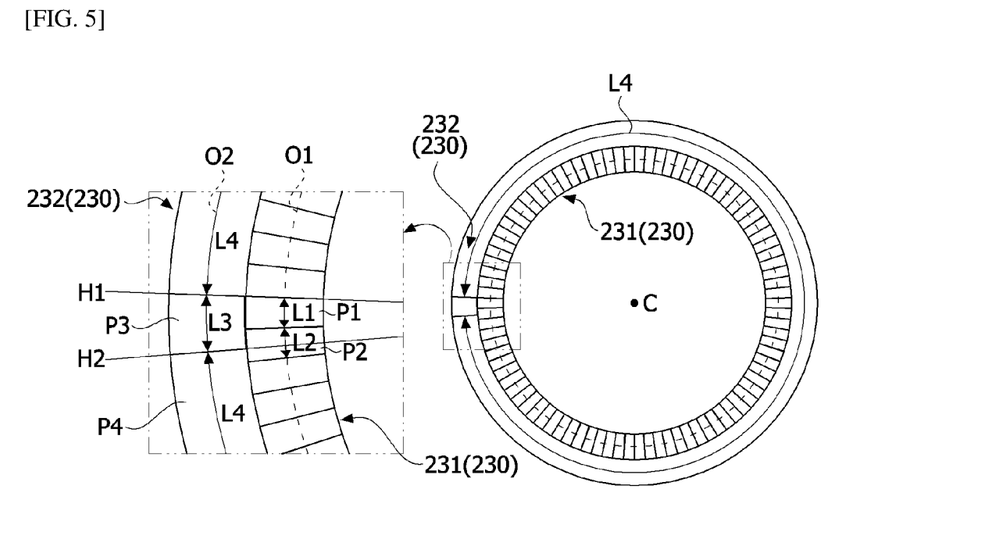
FIG. 5 is a plan view illustrating a length of a first pole in a circumferential direction and a length of a second pole in the circumferential direction in a sensing magnet.

FIG. 5 is a plan view illustrating a length of the first pole P1 in the circumferential direction and a length of a second pole P2 in the circumferential direction in the sensing magnet 230.

Referring to FIG. 5, in the second sensing magnet 232, a length L3 of the first pole P3 in the circumferential direction and a length L4 of the second pole P4 in the circumferential direction are different. Hereinafter, a length in the circumferential direction may be a length in the first circumference O1 or the second circumference O2. In the second sensing magnet 232, the length L3 of the first pole P3 in the circumferential direction may be shorter than the length L4 of the second pole P4 in the circumferential direction. In the first sensing magnet 231, a length L1 of the first pole P1 in the circumferential direction and a length L2 of the second pole P2 in the circumferential direction may be the same. In addition, the length L3 of the first pole P3 of the second sensing magnet 232 in the circumferential direction may be longer than the length L1 of the first pole P1 of the first sensing magnet 231 in the circumferential direction.

The length L3 of the first pole P3 of the second sensing magnet 232 in the circumferential direction may be shorter than a sum of the length L1 of one first pole P1 in the circumferential direction and the length L2 of one second pole P2 in the circumferential direction of the first sensing magnet 231. This is because a position of one end or the other end of the first pole P3 of the second sensing magnet 232 in the circumferential direction of the sensing magnet 230 is an important position to recognize one turn of the rotor 200, which is considered to limit the length L3 of the first pole P3 in the circumferential direction. When the length L3 of the first pole P3 of the second sensing magnet 232 in the circumferential direction is longer than the sum of the length L1 of one first pole P1 in the circumferential direction and the length L2 of one second pole P2 in the circumferential direction of the first sensing magnet 231, it is difficult to precisely recognize one turn of the rotor 200.

One end of the second sensing magnet 232 and one end of the first sensing magnet 231 may be disposed on a first straight line H1 in the radial direction. The other end of the second sensing magnet 232 may be disposed on a second straight line H2 in the radial direction. The other end of the first sensing magnet 231 may be disposed on a straight line different from the second straight line H2. The first straight line H1 may correspond to a reference position of a rotation angle of the rotor 200. That is, a position of the first straight line H1 in the circumferential direction may be a reference position for recognizing one turn of the rotor 200.

Figure 6:
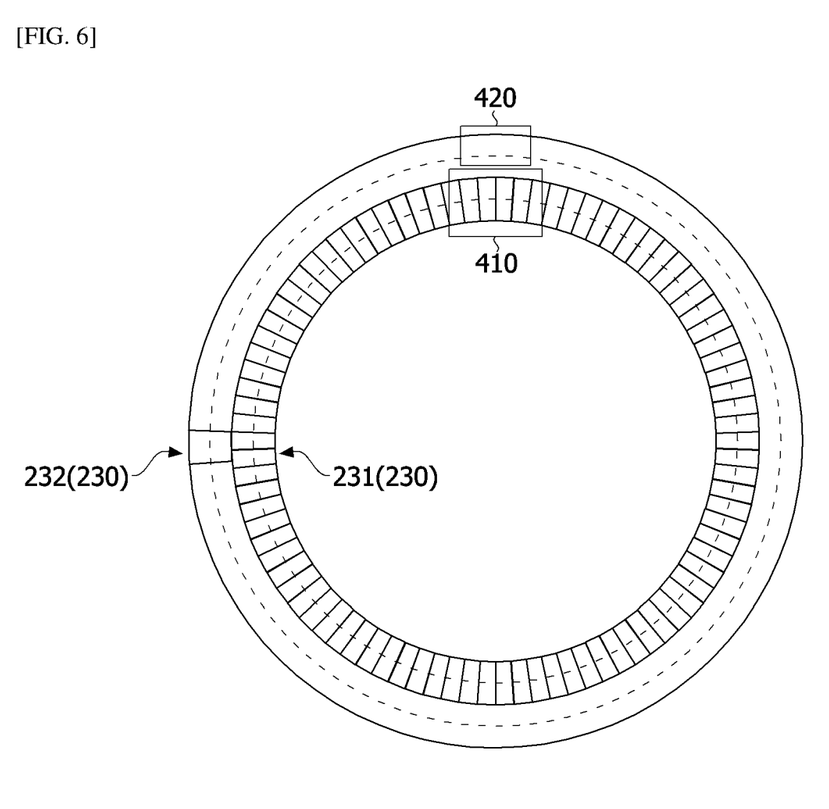
FIG. 6 is a view illustrating a first sensor, a second sensor, and the sensing magnet.

FIG. 6 is a view illustrating the first sensor 410, the second sensor 420, and the sensing magnet 230.

Referring to FIG. 6, at least a part of the first sensor 410 may be disposed to overlap the first sensing magnet 231 in the axial direction. The first sensor 410 detects a change in magnetic flux corresponding to rotation of the first sensing magnet 231. At least a part of the second sensor 420 may be disposed to overlap the second sensing magnet 232 in the axial direction. The second sensor 420 detects a change in magnetic flux corresponding to rotation of the second sensing magnet 232. For example, the second sensor 420 may detect a change in magnetic flux due to one first pole P1 in the second sensing magnet 232.

The first sensor 410 and the second sensor 420 may be disposed on the substrate 400.

Figure 7:
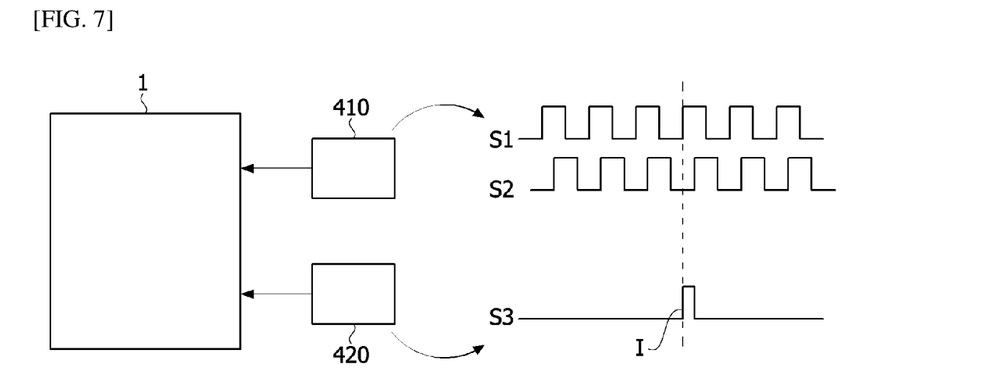
FIG. 7 is a view illustrating a control unit, a first sensor, and a second sensor.

FIG. 7 is a view illustrating a control unit 1, the first sensor 410, and the second sensor 420.

Referring to FIG. 7, the control unit 1 receives information about a change in magnetic flux detected by the first sensor 410. The control unit 1 may generate a first sensing signal S1 and a second sensing signal S2 which have a pulse waveform of an ON state with a voltage of 5 V and a pulse waveform of an Off state with a voltage of 0 V when the first sensor 410 detects the first pole P1 and the second pole P2, respectively. In this case, the first sensing signal S1 and the second sensing signal S2 may have a phase difference.

The control unit 1 receives information about a change in magnetic flux detected by the second sensor 420. The control unit 1 may generate a third sensing signal S3 having a pulse waveform of an ON state with a voltage of 5 V when the second sensor 420 detects the first pole P3 and an Off state with a voltage of 0 V when the second sensor 420 detects the second pole P4. The third sensing signal S3 has one index pulse waveform I because there is one first pole P3. A time point at which the index pulse waveform I is generated may become a reference of one turn of the rotor 200.

Figure 8:
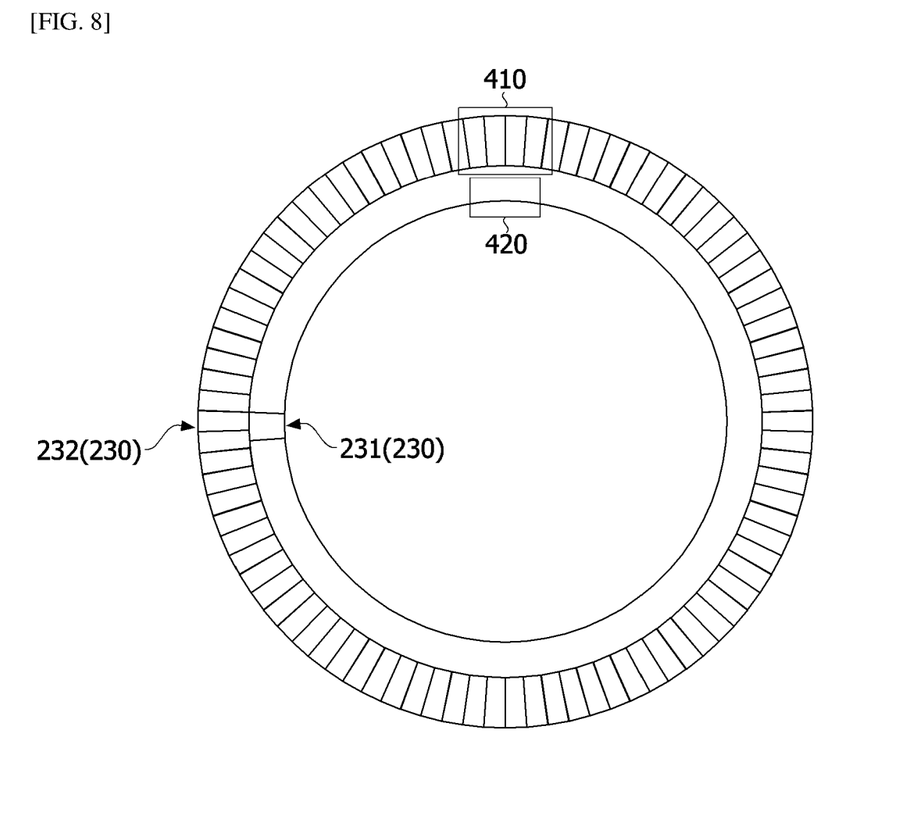
FIG. 8 is a plan view illustrating a sensing magnet according to a modified embodiment.

FIG. 8 is a plan view illustrating a sensing magnet 230 according to a modified embodiment.

Referring to FIG. 8, in the sensing magnet 230 according to the modified embodiment, a second sensing magnet 232 may be disposed inside a first sensing magnet 231. Therefore, a first sensor 410 may be disposed relatively outside a second sensor 420.

Figure 9:
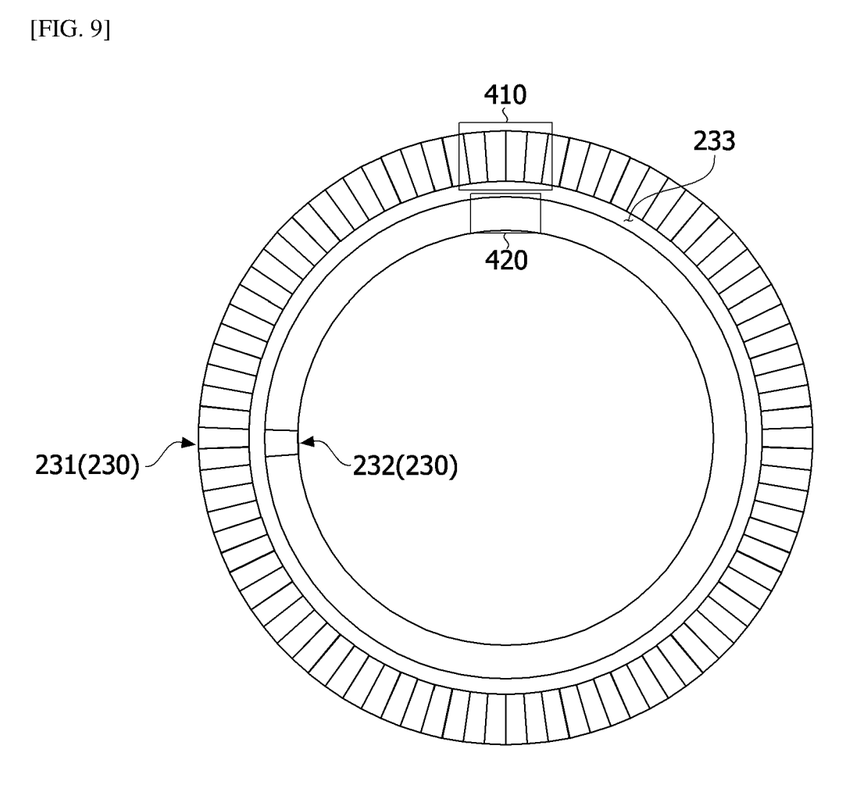
FIG. 9 is a plan view illustrating a sensing magnet according to another modified embodiment.

FIG. 9 is a plan view illustrating a sensing magnet 230 according to another modified embodiment.

Referring to FIG. 9, the sensing magnet 230 according to another modified embodiment may include a non-magnetized region 233. The non-magnetized region 233 may be disposed between a second sensing magnet 232 and a first sensing magnet 231 in a radial direction.

Figure 10:
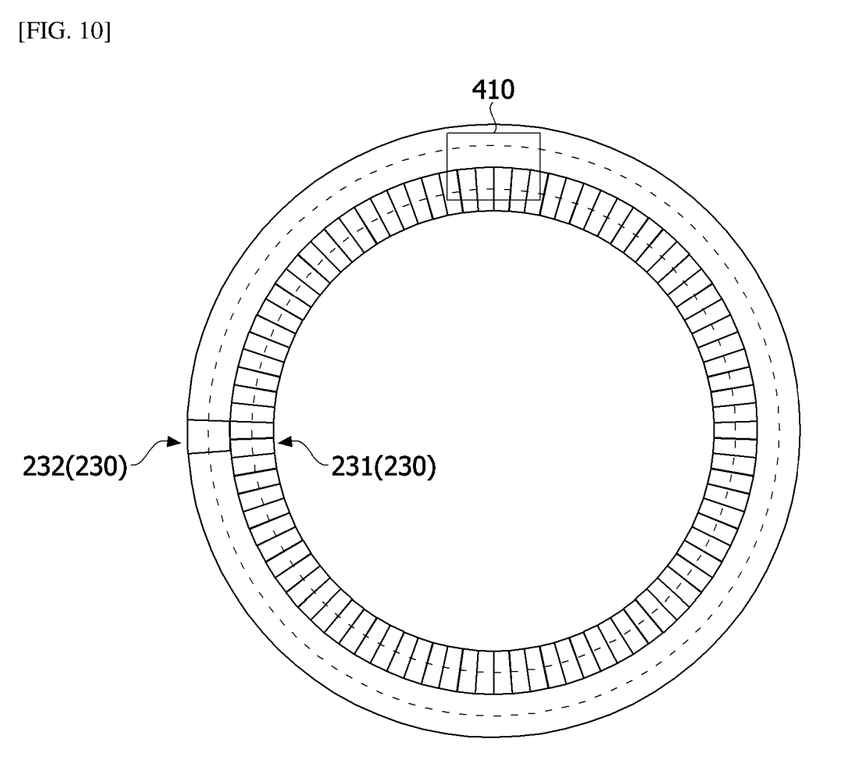
FIG. 10 is a plan view illustrating a sensing magnet according to still another modified embodiment.

FIG. 10 is a plan view illustrating a sensing magnet 230 according to still another modified embodiment.

Referring to FIG. 10, a change in magnetic flux of a first sensing magnet 231 and a change in magnetic flux of a second sensing magnet 232 may be detected by one first sensor 410. A part of the first sensor 410 may be disposed to overlap the first sensing magnet 231 in an axial direction. Another part of the first sensor 410 may be disposed to overlap the second sensing magnet 232 in the axial direction. That is, the first sensor 410 may be disposed to cross the first sensing magnet 231 and the second sensing magnet 232 in a radial direction. First and second sensing signals S1 and S2, through which a position of a rotor 200 may be detected, and a third sensing signal S3, through which one turn of the rotor 200 may be detected, may be generated using only the first sensor 410.

Figure 11:
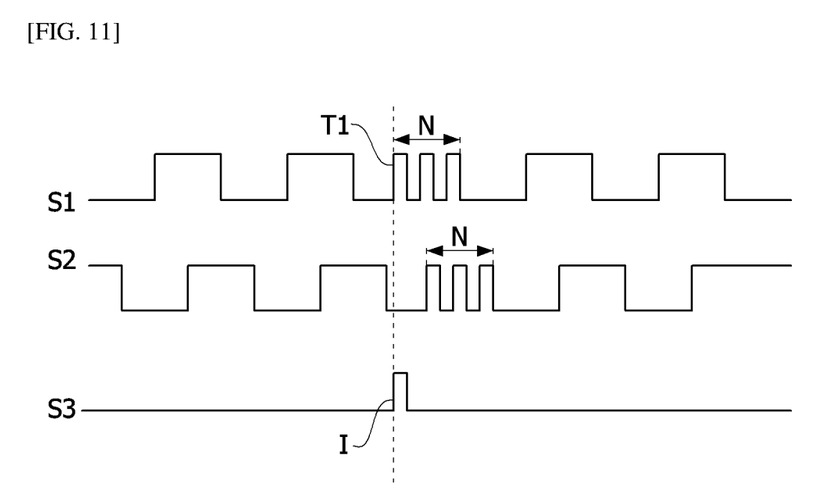
FIG. 11 is a view illustrating sensing signals generated due to a change in magnetic flux detected by a first sensor of FIG. 10.

FIG. 11 is a view illustrating sensing signals generated due to a change in magnetic flux detected by the first sensor 410 of FIG. 10.

Referring to FIG. 11, when a second sensing magnet passes the first sensor 410, irregular pulse waveforms N are formed in the first sensing signal S1 and the second sensing signal S2. This is because a regular change in magnetic flux due to a first pole P1 and a second pole P2 of a first sensing magnet is affected while a first pole P1 of the second sensing magnet passes the first sensor 410. An index signal for recognizing one turn of the rotor 200 may be extracted using the irregular pulse waveforms N. Widths of the irregular waveforms are different from a width of a regular pulse waveform due to the first sensing magnet 231.

A control unit 1 may generate the third sensing signal S3 having an index pulse waveform I at a time point of a rising edge T1 from which the pulse waveform N starts among the first sensing signal S1 and the second sensing signal S2.

Since the second sensing signal S2 for detecting one turn of the rotor 200 may be generated using only one first sensor 410 without a separate second sensor 420, there is an advantage of reducing the number of components.

Figure 12:
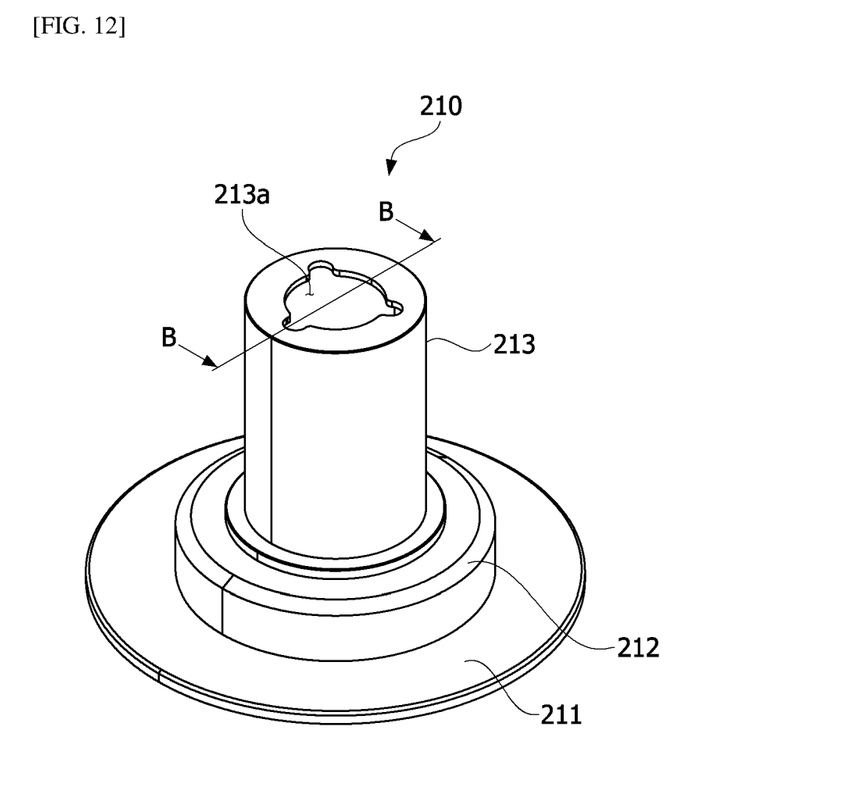
FIG. 12 is a view illustrating a yoke.
Figure 13:
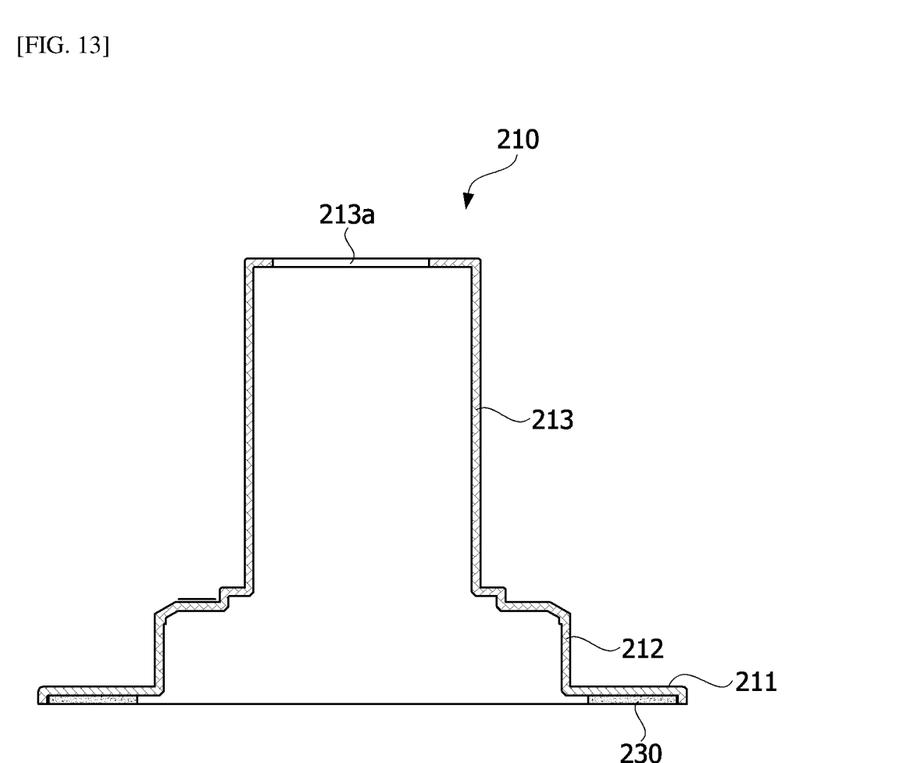
FIG. 13 is a side cross-sectional view illustrating the yoke along line B-B of FIG. 12.

FIG. 12 is a view illustrating the yoke 210, and FIG. 13 is a side cross-sectional view illustrating the yoke 210 along line B-B of FIG. 12.

Referring to FIGS. 3, 12, and 13, the yoke 210 may include a base 211, a magnet accommodation part 212, and a column part 213. The yoke 210 may be a substantially cylindrical member having one side and the other side which are open. The magnet accommodation part 212 may protrude from the base 211. The column part 213 may protrude from the magnet accommodation part 212. Inner diameters of the base 211, the magnet accommodation part 212, and the column part 213 may be different from each other. The inner diameter of the base 211 may be greater than the inner diameter of the magnet accommodation part 212. The inner diameter of the magnet accommodation part 212 may be greater than the inner diameter of the column part 213.

The sensing magnet 230 is disposed inside the base 211. The driving magnet 220 is disposed inside the magnet accommodation part 212. A part of the bearing housing 500 may be disposed inside the column part 213. One end surface of the column part 213 is in contact with one end surface of the bushing 800 in the axial direction. A hole 213a through which the shaft 100 and the coupling member 10 pass may be disposed in one surface of the column part 213.

The column part 213 may be disposed to overlap the holder 900 in the radial direction. The column part 213 may be disposed to overlap the first mirror 1000 and the second mirror 1100 in the radial direction. The above-described shape of the yoke 210 is provided in consideration of characteristics of the shaft 100, the first mirror 1000, and the second mirror 1100 which are disposed to extend in the axial direction.

The present invention can be used in various apparatuses for vehicles, home appliances, or the like.

The invention claimed is:

1. A motor comprising:
a shaft;
a rotor coupled to the shaft; and
a stator disposed between the shaft and the rotor,
wherein the rotor includes a yoke coupled to the shaft and a driving magnet and a sensing magnet which are coupled to the yoke,
the sensing magnet includes a first sensing magnet and a second sensing magnet,
a first pole and a second pole are alternately disposed on a first circumference of the first sensing magnet, and
the second sensing magnet is disposed on a second circumference having a radius different from a radius of the first circumference and includes a first pole and a second pole of which a length in a circumferential direction is different from a length of the first pole of the second sensing magnet in the circumferential direction,
wherein one end of a first pole of the second sensing magnet and one end of a first pole of the first sensing magnet are disposed on a first straight line in a radial direction; and
the other end of a second pole of the second sensing magnet and the other end of a second pole of the first sensing magnet are disposed on different straight lines in the radial direction.

2. The motor of claim 1, wherein the length of the first pole of the second sensing magnet in the circumferential direction is longer than a length of the first pole of the first sensing magnet in the circumferential direction.

3. The motor of claim 1, wherein the length of the first pole of the second sensing magnet in the circumferential direction is shorter than the length of the second pole of the second sensing magnet in the circumferential direction.

4. The motor of claim 3, wherein the first straight line corresponds to a reference position of a rotation angle of the rotor.

5. The motor of claim 1, wherein the second sensing magnet has one first pole and one second pole.

6. The motor of claim 1, wherein the yoke includes:
a base;
a magnet accommodation part protruding from the base; and
a column part protruding from the magnet accommodation part.

7. The motor of claim 6, wherein
the sensing magnet is disposed on the base.

8. The motor of claim 1, wherein the length of the first pole of the second sensing magnet in the circumferential direction is shorter than a sum of the length of one first pole in the circumferential direction and the length of one second pole in the circumferential direction in the first sensing magnet.

9. The motor of claim 1, wherein the motor includes a substrate spaced apart from the yoke, and the substrate includes a first sensor of which at least a part overlaps the first sensing magnet in an axial direction and a second sensor of which a part overlaps the second sensing magnet in the axial direction.

10. The motor of claim 1, wherein the sensing magnet includes a non-magnetized region, and the non-magnetized region is disposed between the first sensing magnet and the second sensing magnet in the radial direction.

* * * * *